Jacob Zuckerman Improved Motive Power
4123
Reissued Sep 13 1870
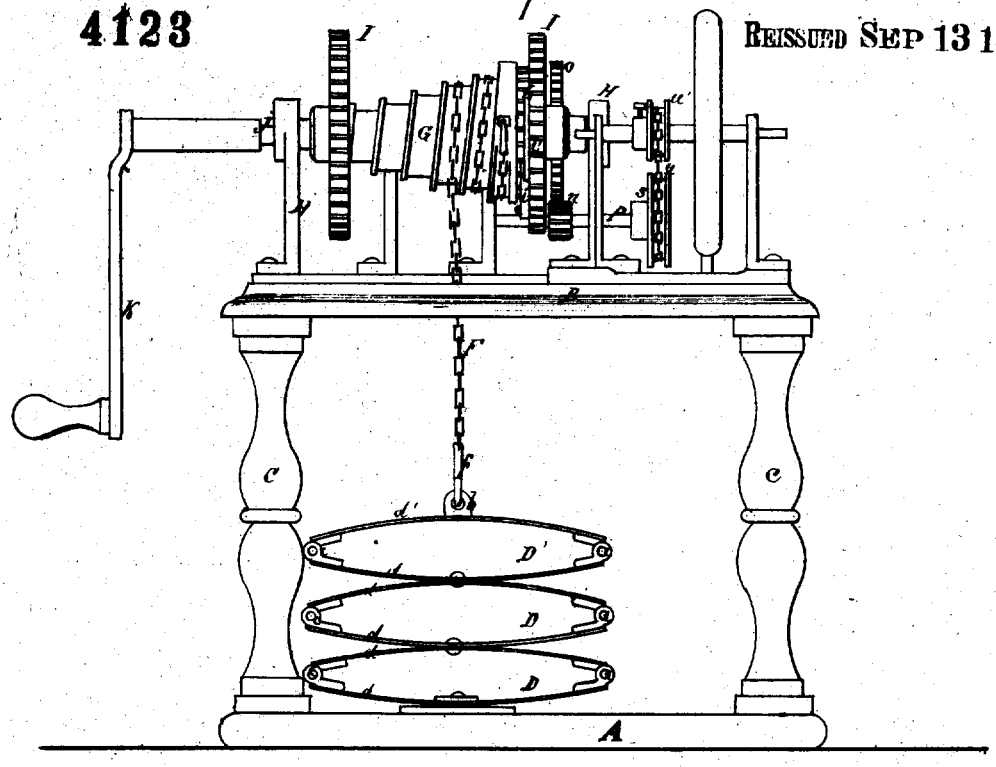
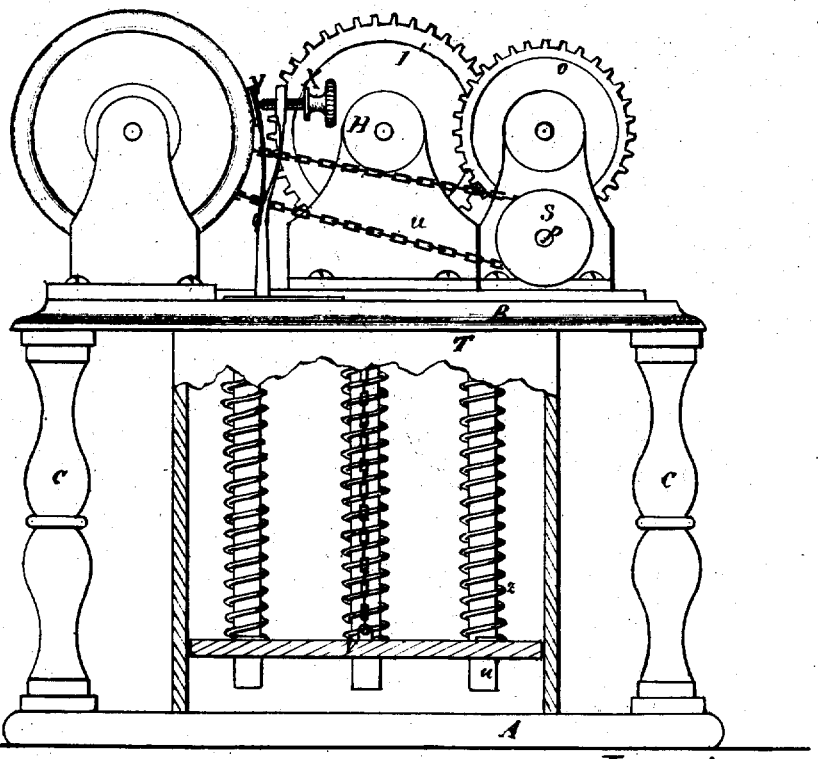
Witnesses
Wm Tyldesley
Chas Habermann
Inventor
Jacob Zuckerman

United States Patent Office.

JACOB ZUCKERMANN, OF SAN FRANCISCO, CALIFORNIA.

*Letters Patent No.* 87,020, *dated February* 16, 1869; *reissue No.* 4,123, *dated September* 13, 1870.

IMPROVEMENT IN MOTIVE-POWER FOR SEWING AND OTHER MACHINES.

The Schedule referred to in these Letters Patent and making part of the same.

*To all whom it may concern:*

Be it known that I, JACOB ZUCKERMANN, of the city and county of San Francisco, State of California, have invented an Improved Motive-power for Sewing and other Machines; and I do hereby declare the following description and accompanying drawing are sufficient to enable any person skilled in the art or science to which it most nearly appertains to make and use my said invention or improvement without further invention or experiment.

The object of my invention is to provide an improved motive-power for light machines, and more particularly for sewing-machines. The device is equally applicable to any of the known machines for sewing, giving the requisite motion, and requiring only to be occasionally wound up, when it will furnish sufficient power to run the machine a certain length of time without further attention; and It consists of a series of gear-wheels, operated by means of springs, and so arranged that the power exerted upon the machine will be uniform. The number of parts liable to get out of order is few, while the machine can be constructed very cheaply.

To more fully illustrate and describe my invention, reference is had to the accompanying drawing forming a part of this specification, of which—

Figure I is an elevation, showing a side view of the motive-power and leaf-springs.

Figure II is the view showing spiral springs, and also the brake in the motive-power.

Similar letters of reference, in each of the figures indicate like parts.

A is the bottom of a frame or stand, having the top B supported at the four corners by posts C.

Upon the bed or bottom board A, I place one of a series of elliptic springs, D, and secure it by means of bolts or screws, firmly to the bed. I then place on the top of this spring any number of other similar springs, securing them firmly together, one on top of the other, placing as many as are requisite to furnish the amount of power desired. These springs are made wide, so as to furnish as great an amount of power as possible, the leaves *d* being joined at each end by means of hinges *e*, which allow them to be expanded to the utmost when sufficiently wound up.

The upper leaf *d'*, of the spring D', is provided with an eye-bolt, *b*, in which the hook *f*, on the end of the chain F, is placed.

When spiral springs L are used, I place either one or a number of said springs within a suitable frame or box, T, closed on top and sides, and open at the bottom; the inner side of the top plate is provided with tubes or rods U, serving as bearings for the spiral springs; these springs are compressed by means of the power applied to the chain attached to plate V sliding within the box or frame.

The chain F passes up through an opening in the top B, and around a fusee G, passing first around the smaller portion, when it is wound up, and then around the larger successively, and secured on the largest part of the fusee. The shaft which carries the fusee has its bearings at each end in the standards H H', and carries the large gear-wheel I.

The pinion on the axle J engages the teeth of the wheel I, and the axle is provided with a crank, K, by turning which the chain is wound around the fusee, and the springs extended.

On the outside of the largest portion of the fusee is a ratchet-wheel, L, carried by the same shaft which carries the fusee, and directly beside it is an independent gear-wheel, I'.

On the side of this wheel is pivoted a pawl, *i*, which operates in the teeth of the ratchet-wheel, and is kept to its place by a flat spring, *i*, also secured to the wheel I', thus allowing the chain to be wound upon the fusee without moving the wheel I', but when the machine is in motion, the pawl *i* engages the teeth of the ratchet-wheel L, and carries it with the shaft, the whole forming a winding ratchet, which communicates the motion, by means of a pinion, to the gear-wheel O, which engages with the pinion *n* on the shaft P, thus giving motion to the train of wheels which it is desired to operate.

On the end of the shaft P is a chain-pulley, S, around which the chain U passes to the main shaft of the sewing-machine, where it passes over a similar chain-pulley, U, and gives the desired motion to the shaft.

In order to place the machine entirely under the control of the operator, I place a spring, *v*, provided with a proper cushion, near the balance-wheel on the main shaft, and by means of a screw, *x*, this spring may be forced against the face of the wheel and stop the machine upon any stitch desired, or regulate the motion of the machine, so as to run at the desired speed.

By the use of the fusee a uniform power is derived from the springs, as, when the springs are extended to their utmost, the chain is wound around the smallest part of the fusee and gradually unwinds upon the larger, as the springs descend and lose power, the larger size of the circle on the fusee compensating for the loss of power in the springs.

Any style of spring capable of being extended may be used, or the elliptic spring may be compressed, and the force exerted in opening be sufficient to give power to run the machine, but I prefer the elliptic spring on account of the facilities it presents, both in construction, and the amount of power capable of being exerted by it.

A spiral spring of sufficient strength, shown at *z'*, would make a convenient device, and, for some machines, may be preferable, but, for operating sewing-machines, where the power to be exerted should be great and uniform, the elliptic spring is preferable.

By the use of this motive-power, sewing-machines can be operated without the use of the treadle, thus saving much labor in working them, and allowing the operator to attend more particularly to the work being done by the machine.

By simply turning the screw so as to press the spring upon the balance-wheel, the working of the machine may be stopped on the instant, and, by turning the screw so as to relieve the pressure, it can be again set in motion without the operator moving from his seat.

The springs necessary for running a sewing-machine will furnish power to run it steadily for about one hour, but, under ordinary circumstances, where it is frequently necessary to stop the machine, it will run, with one winding up, two hours and over, when it will be necessary to again wind it up, which can be done quite easily, if desired, while the operator remains sitting.

This motive-power can be constructed at a comparatively small cost, and the parts are few and simple, and not liable to get out of order.

Having thus described my invention,

What I claim, and desire to secure by Letters Patent, is—

The motive-power, consisting of the frame, spiral spring or springs, or the series of semi-elliptic springs D, connected at their ends by hinge-joints, in combination with the spirally-grooved fusee G, the fusee and the springs being connected by means of the chains, the gear-wheels, shafts, belt, and brake, the whole constructed and arranged substantially as and for the purpose set forth.

In witness whereof I have hereunto set my hand.

JACOB ZUCKERMANN.

Witnesses:

EDM. F. BROWN,

JAMES S. GRINNELL.